July 4, 1944.   F. W. MEREDITH   2,352,649
INDICATING OR CONTROL APPARATUS IN AIR OR WATER CRAFT
Filed June 13, 1939
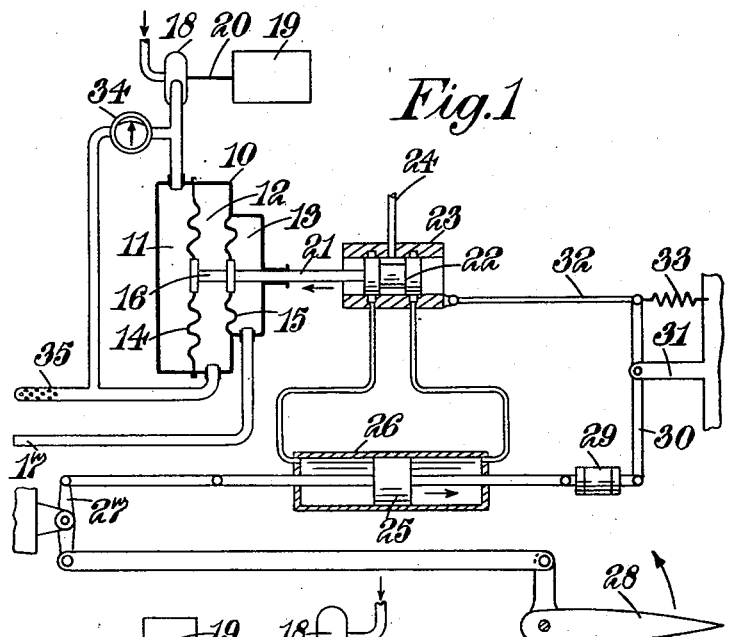
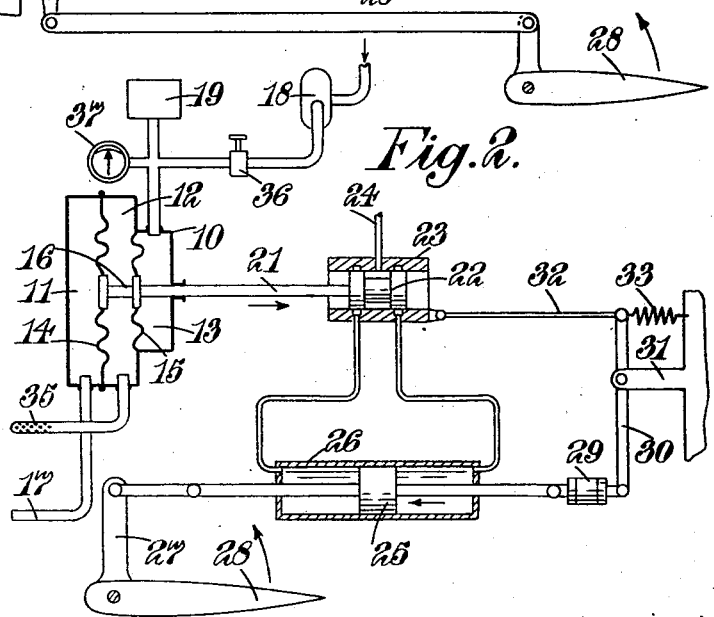
Frederick W. Meredith
By
Watson, Cole, Grindle & Watson
ATTYS.

Patented July 4, 1944

2,352,649

UNITED STATES PATENT OFFICE 2,352,649

INDICATING OR CONTROL APPARATUS IN AIR OR WATER CRAFT

Frederick William Meredith, London, England, assignor to S. Smith & Sons (Motor Accessories) Limited, London, England, a British company Application June 13, 1939, Serial No. 278,939
In Great Britain June 18, 1938

7 Claims. (Cl. 244—78)

This invention relates to indicating or control apparatus installed in aircraft, the correct indication or control of which is dependent on a predetermined relationship being maintained between the speed of some rotary member, such as the rotor of a gyroscope, tachometer or log, and the forward speed of the craft. Such apparatus will be hereinafter referred to as "apparatus of the kind specified." The Lanchester pendulum (described for instance in the specification of British Patent No. 129,727 to F. W. Lanchester, complete accepted July 24, 1919), is an example of such apparatus.

The object of the invention is to improve the accuracy of the indication or control by providing means for maintaining the said predetermined relationship.

In such apparatus, according to the present invention, means operative when a variation of the said relationship occurs is provided to effect a variation of the speed of the craft to restore the relationship. Thus, the rotary member may be any rotary element which is adapted to be driven at a predetermined constant speed and the craft controlled as to speed according to the speed of this rotary member so that it travels with a constant forward speed, and consequently the speed of rotation may serve as an indication of the forward speed under steady conditions. In any event, however, even when the rotary member selected is subjected to controlled variations in speed, it is the purpose of the present invention to provide means for maintaining constant the ratio of the forward speed of the craft to the rotary speed of the rotary member, by effecting any necessary changes in the air speed of the craft to restore such ratio.

According to a further feature of the invention there is provided a movable control member for varying the speed of the craft, means for applying to this control member a force dependent upon the speed of rotation of the rotary member and means for applying to the control member an opposing force dependent upon the speed of the craft. In one application of the invention to aircraft the control member is pressure-responsive and controls the elevators of the aircraft, and means is provided for applying to the control member a fluid pressure dependent upon the speed of rotation of the rotary member and a fluid pressure dependent upon the speed of the craft, in the opposed sense.

In one specific construction the control member comprises two coupled flexible diaphragms of different size dividing a chamber into three compartments, to the outer of which compartments adjacent the larger diaphragm, the fluid pressure dependent upon the speed of rotation of the rotary member is applied and to the other outer compartment the fluid pressure dependent upon the speed of the craft is applied, the intermediate compartment being open to static air pressure. An indicator is conveniently provided operated by the fluid pressure dependent upon the speed of rotation of the said rotary member in order to provide an indication of air speed when the coupled diaphragms return to their central position.

Two specific embodiments of apparatus according to the invention are illustrated diagrammatically in Figures 1 and 2 of the accompanying drawing by way of examples.

Referring to Figure 1, a chamber 10 is divided into three compartments 11, 12 and 13 by means of two flexible diaphragms 14 and 15. These diaphragms are of different size due to differences in fluid pressures which are applied to them and are coupled by a rigid connecting link 16. The compartment 13 is connected to a Pitot tube 17 producing an air pressure proportional to the square of the speed of the craft. The compartment 11 is connected to the output of a centrifugal pump 18 arranged to deliver a pressure proportional to the square of its speed of rotation, and driven at a speed equal or proportional to the speed of a rotary member indicated at 19. This rotary member 19 in this embodiment is a motor device which is run at a predetermined constant speed and may be constituted by any such member employed in an indicating or control device in the craft and required to rotate at a speed proportional to the forward speed of the craft. It may thus be constituted, for instance, by the rotor of a gyroscope, tachometer or log and in one specific instance may be constituted by the rotor of the gyroscope for aileron control, as described in applicant's British Patent No. 422,813, complete accepted January 18, 1935. The coupling between the pump 18 and the rotor 19 is conveniently such that these parts rotate at the same speed and the coupling which is indicated by the line 20 in Figure 1 is of any conventional type and may be of mechanical, electrical, hydraulic or pneumatic form.

The rigid connecting link 16 for the diaphragms is connected to a spindle 21 for operation of the elevators of an aircraft through a servomotor in known manner. The spindle 21 is connected to a piston valve 22 movable in a cylinder 23 for controlling the supply of fluid under pressure through a pipe 24 to opposite sides of a piston 25 in a servomotor cylinder 26. The piston is connected by a linkage 27 to an elevator indicated at 28. To provide the necessary follow-up the piston 25 is also connected to one arm of a lever 30 pivoted on a fixed bracket 31, the other arm of the lever being connected by a link 32 to the cylinder 23. Known centering mechanism comprising a viscous element 29 and a spring 33 is provided for the purpose of recentering the valve cylinder 23 and hence the diaphragms 14 and 15 when the trimming position of the elevator is varied.

In operation, the rotor runs at a predetermined constant speed so that the pressure applied to the diaphragm 14 is maintained constant and normally balances the pressure due to the speed of the craft as applied to the diaphragm 15. Any change in air speed will then result in a change of pressure on the smaller diaphragm 15 and a consequent movement of the connecting link 16. The elevator 28 will consequently be moved so as to change the air speed and the control is so arranged that the direction of movement is such as to re-establish the required air speed and thus restore the connecting link 16 to its original position. Thus, the desired ratio between the speed of the rotary member 19 and the air speed is maintained. Changes in air speed may be effected by varying the speed of the rotary member 19 and the pump 18.

An indicating manometer 34 is connected between the output of the pump 18 and a static pressure head 35 which is connected to the intermediate compartment 12. This manometer thus indicates the difference between the pump pressure and the static pressure and is conveniently graduated in air speed so as to be used as a guide in regulating the speed of the rotary member and pump in accordance with the required indicated air speed. When the connecting link returns to its datum position this instrument will give a reading of indicated air speed.

In the modified arrangement shown in Figure 2, there are employed the flexible diaphragms 14 and 15 in the chamber 10, as in the preceding construction, the compartment 12 between the diaphragms being connected to the static pressure head 35 and the compartment 11, in this case, being connected to the Pitot tube 17. Air under pressure is applied to the compartment 13 from the centrifugal pump 18 through an adjustable pressure governing valve 36. The rotary member 19 is in this case driven or controlled as to its speed by the air pressure which is applied to the compartment 13 and an indicating instrument 37 is provided responsive to this pressure. The diaphragms 14 and 15 coupled by the connecting link 16 control automatically the movements of the elevators of the aircraft, as described with reference to Figure 1.

Thus, in the arrangement shown in Figure 2, if the square of the speed of the rotary member 19 is proportional to the pressure applied to the compartment 13 the speed of the craft is controlled according to the speed of the rotary member 19. The speed of the craft may be changed by adjusting the governor valve 36 so as to vary the available pressure applied to the compartment 13 and the rotary member 19. The indicating instrument 37 thus provides an indication of air speed and may conveniently be used to facilitate regulation of the valve 36 according to the required indicated air speed.

It should be understood that it is the constant ratio between the speed of the aircraft and the speed of the rotary member which is the important factor to be maintained by the provisions of the present invention. In the embodiment shown in Figure 1, the rotary motor member, which is selected for employment as the rotating element, is the constant speed member of a gyroscope or similar device, and it is the constancy of this speed which operates as a governor; whereas, in the arrangement shown in Figure 2, it is the constancy of the pressure provided by the valve 36 which provides the governing factor.

I claim:

1. Control apparatus for aircraft having a movable control surface for varying the speed of the craft, comprising the combination of a control member, which control member comprises two flexible diaphragms of different size spaced apart and coupled together, a chamber across which both of said diaphragms extend to divide the chamber into three compartments side by side, a rotary member, means for applying to the outer one of said compartments which is adjacent the larger diaphragm, an air pressure dependent upon the speed of rotation of the rotary member, and means for applying to the outer one of said compartments is adjacent the smaller diaphragm an air pressure dependent upon the speed of the craft, the compartment between said diaphragms being open to static pressure, and means operated by said control member to actuate the control surface of the craft.

2. Control apparatus for aircraft having a movable control surface for varying the speed of the craft, comprising the combination of two flexible diaphragms of different size spaced apart and coupled together, a chamber across which both of said diaphragms extend to divide the chamber into three compartments side by side, a rotary member, a rotary pump producing air under pressure, means for rotating said pump at a speed proportional to the speed of said rotary member, means for applying an air pressure derived from the output of said pump to the outer one of said compartments adjacent the larger diaphragm, means for applying to the outer one of said compartments adjacent the smaller diaphragm an air pressure depending upon the speed of the craft, the compartment between said diaphragms being open to static air pressure, and means operated by diaphragms for controlling the said control surface of the craft.

3. Control apparatus for aircraft having a movable control surface for varying the speed of the craft, comprising the combination of two flexible diaphragms of different size spaced apart and coupled together, a chamber across which said diaphragms extend to divide the chamber into three compartments side by side, a rotary member, a pump for producing air under pressure, means for supplying said air under constant pressure to said rotary member for driving the latter and to the outer one of said compartments which is adjacent to the smaller diaphragm, so that the pressure applied to the diaphragms is proportional to the speed of the rotary member, means for applying to the outer one of said compartments adjacent the larger diaphragm an air pressure dependent upon the speed of the craft, the compartment between the diaphragms being open to static air pressure and means operated by the diaphragms for controlling the said control surface of the craft.

4. Control apparatus for aircraft having a movable control surface for varying the speed of the craft, comprising the combination of two flexible diaphragms of different size spaced apart and coupled together, a chamber across which said diaphragms extend to divide the chamber into three compartments side by side, a rotary member, a rotary air pump, means for rotating said pump at a speed proportional to the speed of said rotary member, means for applying air pressure derived from the output of said pump to the outer one of said compartments which is adjacent the larger diaphragm, means for applying to the outer one of said compartments which is adjacent the smaller diaphragm an air pressure dependent upon the speed of the craft, the compartment between said diaphragms being open to static air pressure, means operated by said diaphragms for controlling the said control surface of the craft and an indicator operated by the air pressure applied to the outer one of said compartments adjacent the larger diaphragm.

5. Control apparatus for aircraft having a movable control surface for varying the speed of the craft, comprising the combination of two flexible diaphragms of different size spaced apart and coupled together, a chamber across which said diaphragms extend to divide the chamber into three compartments side by side, a rotary member, a rotary pump for producing air under pressure, means for supplying said air under constant pressure to said rotary member for driving the latter and to the outer one of said compartments which is adjacent the smaller diaphragm, so that the pressure applied to the diaphragms is proportional to the speed of the rotary member, means for applying to the outer one of said compartments adjacent the larger diaphragm an air pressure dependent upon the speed of the craft, the compartment between said diaphragms being open to static air pressure, means operated by the diaphragms for controlling the said control surface of the craft and an indicator operated by the air pressure applied to said rotary member and to the outer one of said compartments adjacent the larger diaphragm.

6. Apparatus for adjusting a control surface of an aircraft, comprising two inter-connected flexible diaphragms, a housing divided by said diaphragms, means for subjecting one of said diaphragms to a dynamic pressure produced by the air, means for subjecting the other of said diaphragms to a biasing fluid pressure, the space between the diaphragms being open to static pressure, and means operated by the said diaphragms automatically to adjust the control surface.

7. Control apparatus for aircraft comprising, in combination, speed varying means for the craft, a flexible diaphragm device having two diaphragms spaced apart and together movable in either of two directions in response to fluid pressures positively applied to the outer sides thereof, means operatively connected between said diaphragm device and said speed varying means to actuate the latter in either direction to increase or diminish the speed of the craft in response to corresponding movements of the diaphragms, means exposed to the atmosphere surrounding the aircraft and so constructed and arranged as to apply fluid pressure proportional to the speed of the craft to the outer side of one of said diaphragms, a driven rotary device carried by said aircraft and embodying pump means, a transmission conduit connecting said pump means and said diaphragm device for positively and continually applying fluid pressure to the outer side of the other of said diaphragms, said latter pressure being proportional to the speed of said rotary device, and means subjected to the static pressure of the surrounding atmosphere and operatively connected to said diaphragm device for applying a pressure between the two diaphragms which is proportional to said static atmospheric pressure, whereby the forces applied to the outer sides of the respective diaphragms act in opposed directions and any unbalance between them results in movement of said diaphragms, said operative connecting means, and said speed varying means to move the last named in a direction to correct the unbalanced condition and restore the constant speed ratio between the speed of the rotating member and that of the aircraft.

FREDERICK WILLIAM MEREDITH.